Oct. 9, 1962 — G. A. BUTTRESS — 3,057,395
MACHINE FOR FORMING PLASTER KEYING RECESSES IN PLASTERBOARD
Filed Jan. 12, 1959 — 2 Sheets-Sheet 1
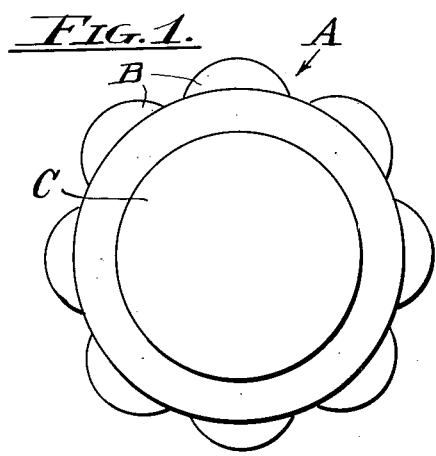
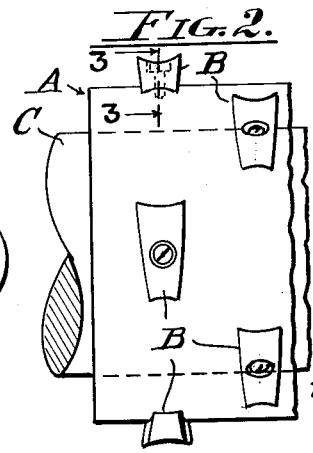
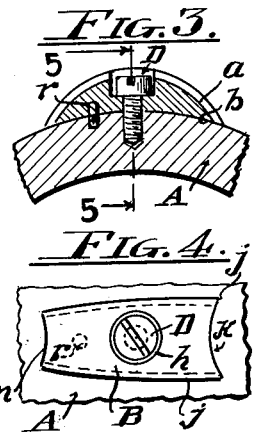
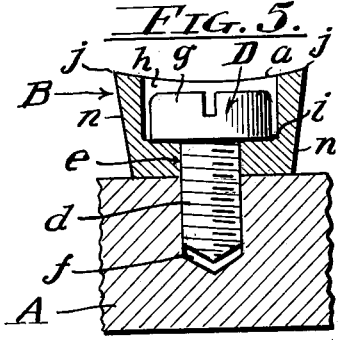
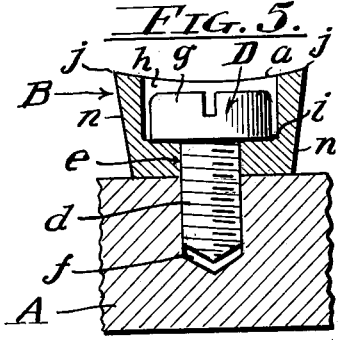
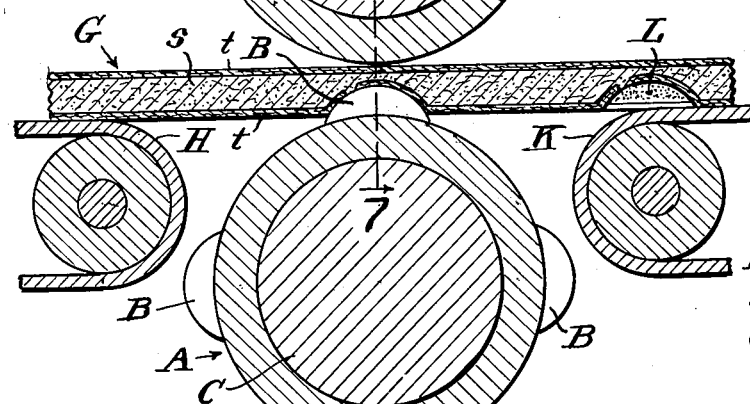
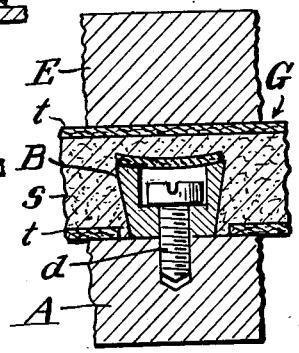
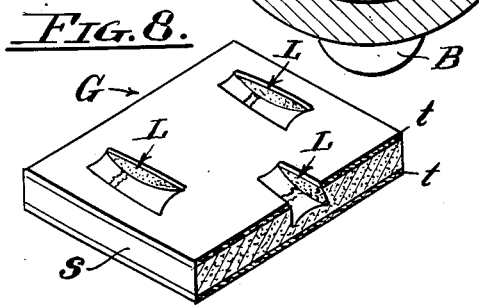
INVENTOR
George A. Buttress;
BY R. S. Berry
ATTORNEY

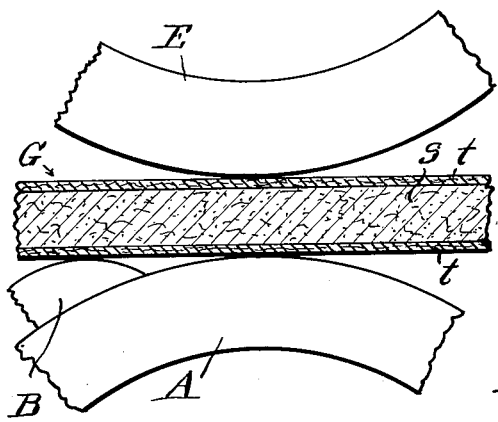
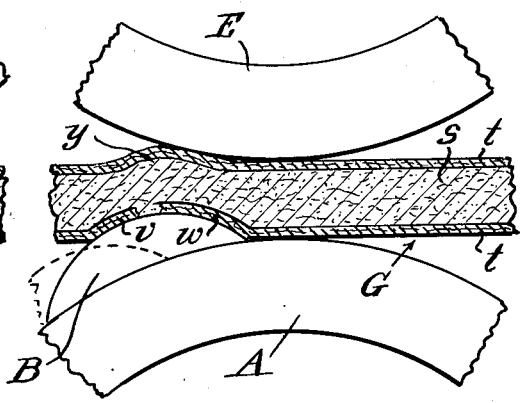
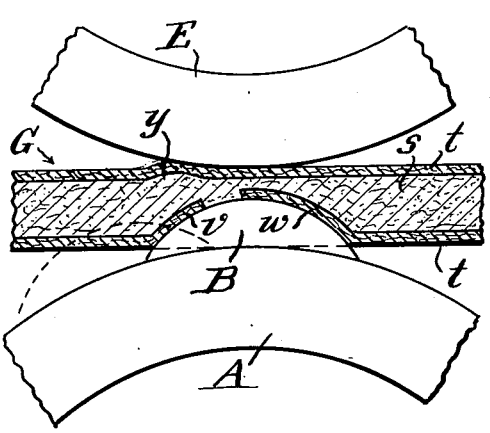
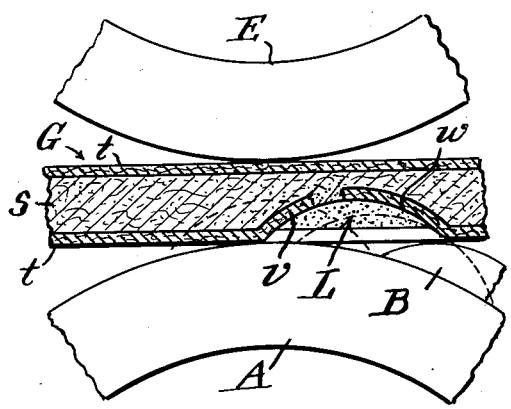
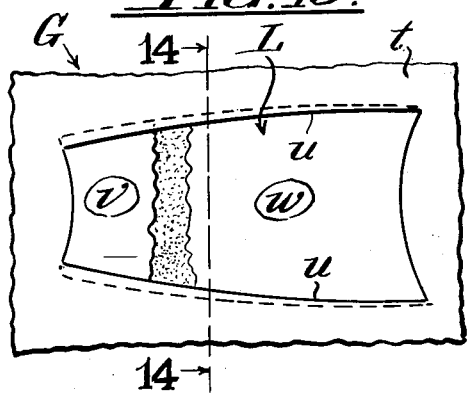
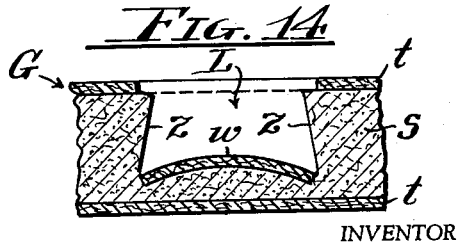

United States Patent Office 3,057,395
Patented Oct. 9, 1962

3,057,395
MACHINE FOR FORMING PLASTER KEYING RECESSES IN PLASTERBOARD
George A. Buttress, 5433 8th Ave., Los Angeles, Calif.
Filed Jan. 12, 1959, Ser. No. 786,284
8 Claims. (Cl. 156—347)

This invention relates to a machine of the character set forth in United States Patent No. 2,708,300 issued to me May 7, 1955, for forming plaster keying recesses in plasterboard and particularly pertains to improvements in the recess forming die employed in such and similar machines wherein plaster-keying depressions are formed in plasterboard of the type embodying a plaster body interposed between facing sheets at the stage of manufacture thereof when the plaster body is soft and wet and the facing sheets are moist, and wherein the depressions or recesses are produced by a series of spaced circumferentially extending rows of spaced dies protruding from the periphery of a horizontal cylindrical roller bearing and rotating against a facing sheet on the plasterboard as the latter is advanced by a conveyor.

In the machine set forth in the aforesaid patent the recesses or depressions are formed of dovetail cross section by the employment of a circumferentially ribbed roller supplementing the die carrying roller for effecting the formation of parallel channels in a facing sheet of the plasterboard on opposite sides of rows of die formed recesses and thereby pressing the plaster sides of the recesses inwardly at the outer portions thereof to thereby reduce the width of the openings of the recesses relative to the bottoms thereof.

The primary object of the present invention is to so shape the recess forming dies as to effect formation of the dovetail recesses without the use of a ribbed roller.

A further object is to provide a one-piece die of the above character which is operable to effect penetration of the plasterboard by a rolling movement so that the die advances from end to end in forming a recess, wherein the trailing end of the die is narrowed relative to the leading end thereof so as to ride freely from the recess and thereby avoid deformation of the margins thereof.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

FIG. 1 is an end view of a die equipped roller;
FIG. 2 is a view in side elevation of an end portion of the roller;
FIG. 3 is an enlarged sectional view taken on the line 3—3 of FIG. 2 showing the die in longitudinal section and depicting the manner of mounting same on a roller;
FIG. 4 is a plan view of the die shown in FIG. 3;
FIG. 5 is an enlarged cross sectional view taken on the line 5—5 of FIG. 3;
FIG. 6 is a view in section of the recess forming mechanism in operation;
FIG. 7 is an enlarged sectional view taken on the line 7—7 of FIG. 6 showing the die in its recess forming position;
FIG. 8 is an isometric view of a fragmentary portion of plasterboard with plaster receiving dovetailed recesses as formed by the dies of the present invention;
FIGS. 9, 10, 11 and 12 are enlarged diagrams in section and elevation showing in progressive steps the mode of producing recesses in plasterboard by the dies of the present invention;
FIG. 13 is an enlarged plan view of a recess formed by the die as depicted in FIGS. 9–12; and FIG. 14 is a view in cross section as seen on the line 14—14 of FIG. 13.

Referring to the drawings more specifically A indicates a roller having a series of spaced circumferentially extending rows of spaced dies B protruding from the periphery thereof. In practice the roller comprises a cylindrical metallic tube having an outside diameter of from four to six inches or thereabouts which tube is fixedly mounted on a shaft C extending longitudinally through the tube and projecting from the ends thereof. The shaft C is horizontally and revolubly mounted in suitable bearings not shown and is driven in any conventional manner as is common in machines of the type to which the invention applies.

The dies B comprise one-piece metallic bodies approximating one and one-quarter inches in length and having a mean width of one-half inch or thereabouts, but which dimensions are not critical and are subject to variation as occasion may require.

As shown the dies are crescent shaped in side elevation and have elongated arcuate outer faces $a$ extending on a radius of three-fourths of an inch or thereabouts and have arcuate inner faces $b$ conformable to the curvature of the periphery of the roller A. Each die B is seated on the periphery of the roller and is detachably secured thereto by a screw D having a threaded shank $d$ which passes through a radial hole $e$ in the die and is engaged in a threaded bore $f$ in the roller, and having a head $g$ countersunk in a recess $h$ in the outer face $a$ and seated on a shoulder $i$ forming the bottom of the recess $h$.

The outer face $a$ of the die is transversely concave and has sharp longitudinal margins $j$ constituting edges.

An important feature of the invention resides in the longitudinal contour and cross-sectional shape of the die B, its arcuate outer face having outwardly bowed margins $j$—$j$ extending on long arcs and diverging generally in relation to each other so that one end $k$ of the die constituting the leading end is wider than the other end $m$ constituting the trailing end, and whereby the die is tapered longitudinally; and the die having its side faces $n$ inclined inwardly toward each other from the outer margins $j$ to the inner margins thereof, whereby the die tapers in cross section inwardly from its arcuate outer face.

The dies thus formed are arranged on the periphery of the roller B with their lengths extending circumferentially of the roller and with the leading ends $k$ of the dies presented in the direction of rotation of the roller which in the arrangement shown in the drawings is clockwise. As a means for holding the dies against rotation, each die is engaged by a pin or stud $r$ fixed on the roller and projecting into the inner side of the die between the screw shank $d$ and an end of the die.

In the application of the invention the roller A has associated therewith a correspondingly dimensioned roller E comprising a cylindrical tube fixed on a shaft F, the pair of rollers A—E being disposed in horizontal parallel superimposed relation to each other and spaced apart a distance equal the thickness of a ribbon or sheet of plasterboard G as shown in FIG. 6, the plasterboard being fed between the rollers A—E on and by conveyor belts H and K. As here shown the roller A is disposed beneath the plasterboard G so that the dies B will form recesses L on the underside thereof, but it is manifest that the relative positions of the rollers A—E may be reversed from that shown. In any event the recessed side of the plasterboard constitutes the outer face thereof to which plaster is to be applied.

In the operation of the invention the rollers A—E are rotated at corresponding uniform peripherial speeds in any suitable fashion and at a speed corresponding to the lineal speed of the conveyor belts H—K and the panel or ribbon of plasterboard G advanced thereon; the rollers A—E moving at their adjacent peripherial portions in the direction of movement of the plasterboard which is soft and wet as it passes between the rollers so as to be readily deformable, the plasterboard comprising the usual plaster body S interposed between a pair of paper facing sheets t—t.

As the roller A rotates the dies B thereon roll in and out of engagement with the adjacent side of the plasterboard and in so doing form spaced rows of spaced recesses L therein as indicated in FIG. 6, the roller E bearing upon the opposite face of the plasterboard and opposing the thrust of the dies except for a portion of the lengths of the leading ends of the dies as will presently be explained.

The action of the dies B in forming the recesses L is particularly shown in FIGS. 9 to 12 inclusive wherein a die B is depicted in a series of progressive stages as it advances in and out of engagement with the plasterboard G.

In FIG. 9 the die B is depicted as disposed when the leading end of the die is brought into initial contact with the facing sheet t on the side of the plasterboard presented to the roller A as the latter rotates in a clock-wise direction and as the ribbon of plasterboard is advanced by the conveyor belts H—K. FIG. 10 shows the die B as positioned when its leading end k and its mid-portion have initially indented the plasterboard, in which position the engaged facing sheet t is severed by a portion of the lengths of the margins j—j of the die along longitudinally parallel oppositely curved lines u—u as indicated in FIG. 13 and wherein the portion of the sheet t between the lines of severance u—u is pressed into the plaster body. At this point the impressed portion of the facing sheet t will be stretched lengthwise and ruptured transversely and will be formed into tongues v—w which subsequently will partly line the bottom of the recess L. Also at this point the plaster body s will be displaced and form a bulging body y thereof directly opposite the die B and immediately contiguous the underside of the roller E in position to be subsequently impressed by the latter.

FIG. 11 depicts the die B in its intermediate and full recess forming position wherein the center of the die lies on a plane extending vertically through the axes of the rollers A—E. In this position the recess L will be completely formed with its bottom wall partly lined by the paper tongues v—w and the plaster bulge y will be at least nearly ironed out by the roller E whereby the plaster forming the bulge y will be forced inwardly to cause displacement of the portions of the plaster body forming the side walls z—z so that such displaced plaster will be caused to abut the opposed inclined side faces n—n of the die thus molding the recess L of dovetail cross section as shown in FIG. 14.

FIG. 12 shows the die B as moving out of the formed recess L by reason of its traveling on an arcuate path away from the plasterboard as it advances with the rotating roller. Withdrawal of the die from the recess L is facilitated without disfiguring the formed margins thereof by reason of the longitudinal taper of the die afforded by the convergence of the side faces of the die from the leading end k to the trailing end m thereof, the decreasing width of the die from its leading end k affording a clearance between the sides n—n of the die B and the sides z—z of the recess L as the die advances out of the recess.

The result of the above described operation is to produce a multiple of recesses L in a plasterboard as shown in FIG. 8 wherein such recesses are tapered longitudinally as shown in FIG. 13 and are of dovetailed cross section as shown in FIG. 14 whereby the recesses will afford a keyed bond with plaster adhered to the recessed side of the plasterboard.

The ribbon of plasterboard on being passed from between the rollers A—E is advanced on the conveyor K to a suitable cut-off mechanism and reduced thereby to panels of suitable lengths which are subsequently dried and packaged in readiness for use.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In a machine for forming plaster-keying recesses of dovetail cross section in plasterboard of the type embodying a plaster body interposed between paper facing sheets at the stage of manufacture thereof when the plaster body is soft and wet and the facing sheets are moist and including a horizontal roller having a series of spaced circumferentially extending rows of spaced dies protruding from the periphery thereof; the improvement wherein each of said dies having an elongated outwardly curved arcuate outer face has laterally outward bowed side margins diverging relative to each other from one end of the dies whereby the die is tapered longitudinally to have a wide end constituting a leading end, and a narrow end constituting a trailing end, and has opposite side faces inwardly inclined from said arcuate outer face, said dies being arranged with their lengths extending circumferentially of the roller with their wide leading ends presented in the direction of rotation of the roller, and means for detachably connecting said dies to said roller.

2. In a machine for forming dove-tail plaster-keying recesses in plasterboard of the type embodying a plaster body interposed between paper facing sheets at the stage of manufacture thereof when the plaster body is soft and wet and the facing sheets are moist, said machine including a horizontal roller having a series of spaced circumferentially extending rows of spaced dies protruding from the periphery thereof; the improvement wherein each of said dies has an elongated outwardly curved arcuate outer face having sharp side margins extending in diverging relation to each other from one end of the die to the other, and has opposed side faces inclined inwardly toward each other from said side margins; said dies being arranged with their lengths extending circumferentially of said roller and with the ends of the divergent side margins thereof presented in the direction of rotation of said roller.

3. A die for forming recesses in plasterboard while in a wet soft state, comprising a one-piece crescent shaped body having a longitudinally tapered outer face and having side faces inwardly inclined from said outer face.

4. A die for forming recesses in plasterboard while in a wet soft state, comprising a one-piece crescent shaped body having a leading end and a trailing end and tapering inwardly from said leading end to said trailing end, said body being dove-tailed in cross section.

5. In a device for forming recesses in plasterboard while in a wet soft state, a roller having a cylindrical outer periphery, and a series of spaced dies fixed on said roller, each of said dies having an elongated crescent shaped body protruding from the periphery of said roller and extending lengthwise circumferentially thereof, said body having a leading end and a trailing end and being arranged with its leading end presented in the direction of forward rotation of said roller and having sharp outwardly bowed outer edges extending in convergent relation to each other from said leading end to said trailing end, and each of said dies having opposed side faces inclined inwardly toward each other from said outwardly bowed outer edges.

6. The structure called for in claim 5 wherein each of said dies has a concave outer face extending between said bowed outer edges and extending between said leading and trailing ends.

7. The structure called for in claim 5 together with a second cylindrical roller, said rollers being arranged in spaced parallel relation to each other for positioning in contact with opposite sides of plasterboard interposed therebetween, said rollers being adapted to be rotated to advance said dies into engagement with said plasterboard leading ends foremost, said dies being adapted to indent one side of the plasterboard passing between the rollers and to displace portions of the board on the opposite side thereof in position to be depressed by said second roller to thereby press displaced material of the plasterboard against the inclined side faces of said dies.

8. A die for forming laterally dove-tailed recesses in plasterboard while in a wet soft state, comprising a one-piece crescent shaped body having a leading end and a trailing end with the leading end of a width exceeding that of the trailing end, said body having its outer face transversely concave and having sharp longitudinal margins constituting cutting edges, said margins being laterally bowed outward along the lengths thereof, and said body having side faces inwardly inclined from said margins.

References Cited in the file of this patent
UNITED STATES PATENTS

| | | |
|---|---|---|
| 1,464,360 | Hicks | Aug. 7, 1923 |
| 1,487,894 | Schumacher | Mar. 25, 1924 |
| 1,589,569 | Schumacher | June 22, 1926 |
| 2,168,803 | Page | Aug. 8, 1939 |
| 2,246,987 | Roos | June 24, 1941 |
| 2,479,207 | Buttress | Aug. 16, 1949 |
| 2,708,300 | Buttress | May 17, 1955 |